United States Patent Office 3,228,990
Patented Jan. 11, 1966

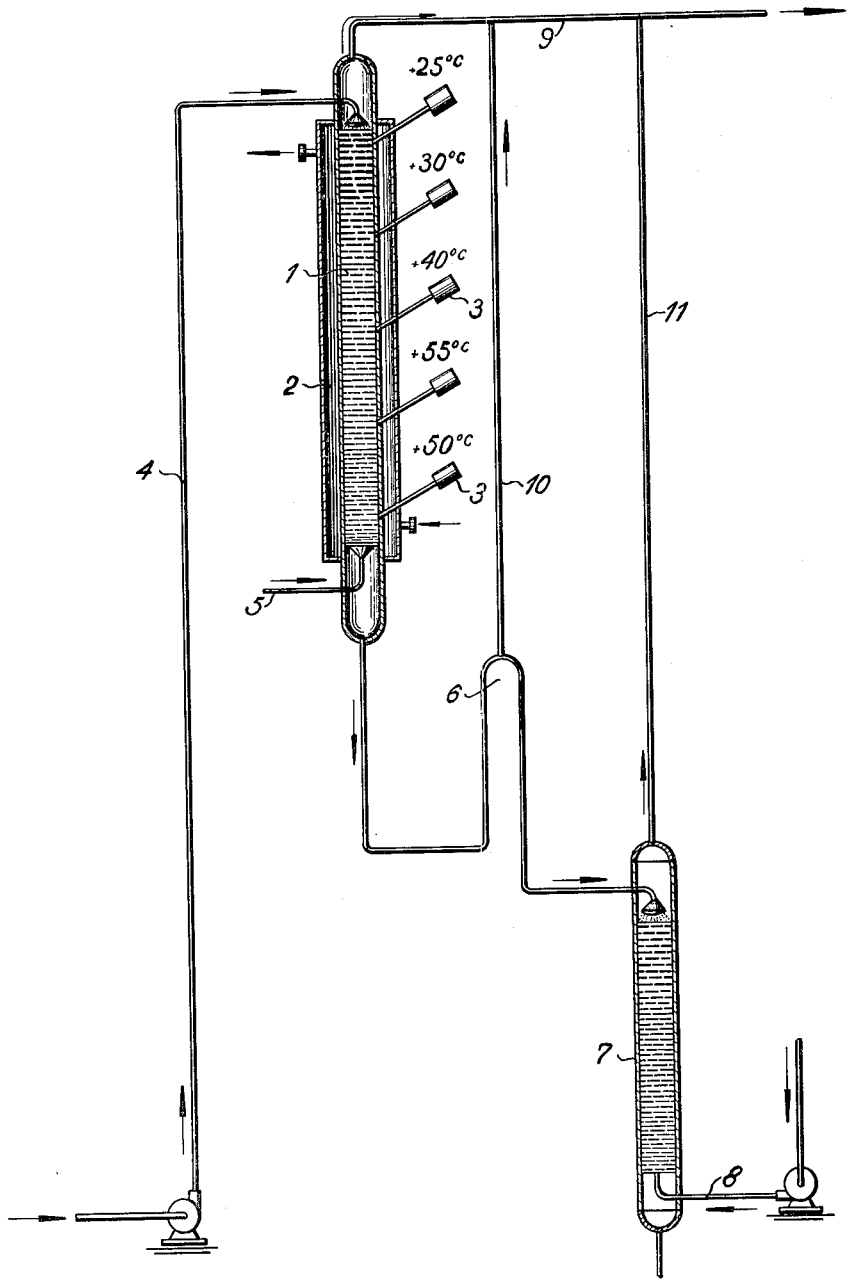

3,228,990
PROCESS FOR THE MANUFACTURE OF 1,2,3-TRI-CHLORO-BUTENE-3 FROM 1,3-DICHLOROBU-TENE-2
Wilhelm Vogt, Knapsack, near Cologne, Hans Weiden, Rodenkirchen, near Cologne, and Peter Komischke, Efferen, near Cologne, Germany, assignors to Knapsack-Griesheim Aktiengesellschaft, Knapsack, near Cologne, Germany, a corporation of Germany
Filed Oct. 2, 1962, Ser. No. 227,865
Claims priority, application Germany, Oct. 10, 1961, K 44,893
7 Claims. (Cl. 260—654)

The present invention is concerned with a process for the manufacture of 1,2,3-trichlorobutene-3 from 1,3-dichlorobutene-2.

It is known that 1,2,3-trichlorobutene-3 can be used as a starting material for making 2,3-dichlorobutadiene-1,3 (cf. Carothers, U.S. Patent 1,965,369 and Klebanski, Journal für Angewandte Chemie, vol. XIX, No. 2, pages 200 to 206, 1946, Russian edition). 1,2,3-trichlorobutene-3 is obtained, in addition to higher chlorinated $C_4$-hydrocarbons, by a substituting chlorine addition on 1,3-dichlorobutene-2 according to the following equations:

(1)
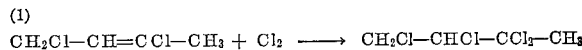

(2)
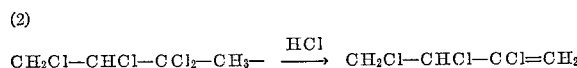

(3)
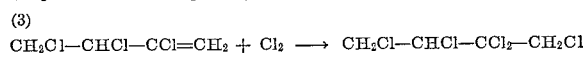

The reaction temperatures should be situated at −50° C. (Carothers) or at −15° C. (Klebanski) in order to obtain a 65 to 70% yield of 1,2,3-trichlorobutene-3 (cf. the following Table 1). At higher temperatures, the substituting chlorination recedes rapidly in favor of a pure chlorine addition with the resultant formation of 1,2,3,3-tetrachlorobutane:

TABLE 1

| Author | Reaction temp., °C. | Reaction mixture (percent by weight) | | |
|---|---|---|---|---|
| | | 1,2,3,3-tetra-chloro-butane | 1,2,3,3,4-penta-chloro-butane | 1,2,3,-tri-chloro-butene-3 |
| Carothers | −50 | 10 | 20 | 70 |
| Do | +45 to 60 | 54 | 18 | 28 |
| Klebanski | −15 | 20-25 | 10-15 | 65-70 |

These two known processes, which are carried out discontinuously while the reaction mixture is mechanically stirred, call for costly cooling brine energy, due to the required low reaction temperatures and due to the great heat effect of 44.5 kcal. per mol reacted 1,3-dichlorobutene-2.

The low reaction temperatures used imply a low reaction velocity so that not less than 10 hours of reaction are necessary (Klebanski) for the quantitative conversion of 1,3-dichlorobutene-2. During such long time of reaction, the resulting 1,2,3-trichlorobutene-3 partially undergoes further reaction with the chlorine with the resultant, undesired formation of 1,2,3,3,4-pentachlorobutane. All the attempts made with the aim to reduce the time of reaction by using copper, $CuCl_2$—, $FeCl_3$— or $CaCl_2$— catalysts did not lead to improved yields of 1,2,3-trichlorobutene-3.

The present invention now provides a process for the manufacture of 1,2,3-trichlorobutene-3 from 1,3-dichlorobutene-2 and chlorine, wherein finely divided or atomized, liquid 1,3-dichlorobutene-2 and gaseous chlorine are continuously conducted countercurrently to one another at temperatures within the range of 20 to 70° C., preferably 20 to 55° C., the resulting liquid, crude chlorination product is freed from residual chlorine and hydrogen chloride by injecting, countercurrently to the chlorination product, an inert gas, preferably air, and purified by distillation.

The process of the present invention can be carried out at atmospheric pressure or at pressures within the range of 0.1 to 3 atmospheres absolute and, preferably, while using 1 to 1.1 mols chlorine per mol 1,3-dichlorobutene-2.

More particularly, the process of the present invention is carried out as follows: the head of a reactor containing filling material is charged with finely divided, liquid 1,3-dichlorobutene-2 while the lower part of the reactor is charged simultaneously therewith and countercurrently to the descending 1,3-dichlorobutene-2 with gaseous chlorine, of which the portion in excess, together with the gaseous hydrogen chloride formed, escapes at the head of the reactor which is cooled with water, the resulting liquid, crude chlorination product is removed from the sump of the reactor and introduced into the head of an expelling zone containing filling material, conducted therein countercurrently to air injected into the lower part of said expelling zone, which entrains the residual chlorine and hydrogen chloride gas and escapes at the head of the expelling zone, and the liquid, crude 1,2,3-trichlorobutene-3 is removed from the sump of the expelling zone and, if desired, introduced into a distilling zone.

The liquid 1,3-dichlorobutene-2 used can be brought into the state of fine subdivision by spraying or atomizing it.

The essential advantage offered by the process of the present invention as compared with the customary discontinuous methods is based on the fact that 1,3-dichlorobutene-2 and chlorine gas are conducted countercurrently to one another, so that the crude chlorination product, which consists of 1,2,3-trichlorobutene-3 to an extent of up to 85 mol percent, can rapidly be removed from the reaction zone and thus prevented from undergoing further chlorination to yield 1,2,3,3,4-pentachlorobutane. Due to such rapid removal, the reaction time is limited to 5 to 15 minutes. The reaction velocity which must be correspondingly high, is obtained by increasing the temperature to at most 70° C.

The discontinuous process disclosed in the above-mentioned U.S. patent is also carried out at 45 to 60° C. but the 1,2,3-trichlorobutene-3 obtained is not directly removed from the reaction vessel immediately after its formation, so that the bulk thereof combines additively with a further amount of chlorine.

As shown in the following Table 2, the proportion of 1,2,3-trichlorobutene-3, which undergoes further chlorination to 1,2,3,3,4-pentachlorobutane is reduced in the reaction mixture to 1 to 4 mol percent when the time of reaction is within the range of 5 to 15 minutes as in the process of the present invention. When metal halides, especially $FeCl_3$, are used, the proportion of higher chlorinated $C_4$-hydrocarbons increases considerably.

The process of the present invention is preferably carried out while using a reactor tube made of chlorine-resistant carbon. It is advantageous to use a Diabon-reactor (Diabon: registered trademark of Messrs. Siemens-Plania, Meitingen, Federal Republic of Germany). The reactor is surrounded by a cooling jacket, filled with ceramic material and operated according to the counter-current principle of a wash column. The apparatus has no means for stirring the reaction mixture. The 1,3-dichlorobutene-2 introduced at the head of the reactor flows countercurrently to the chlorine gas introduced into the lower part of the reactor. The reaction mixture specified in the following Table 2 is removed at the bottom of the reactor.

Due to the reaction temperatures used in the process of the present invention, which are higher than those used in the methods previously known, the costly cooling brine system can be omitted and water used for cooling. It is also advantageous to remove the residual hydrogen chloride and chlorine from the reaction mixture by blowing, the two substances being blown out in a gas wash column according to the countercurrent principle. A reaction mixture blown out with air in the manner described above merely contains traces of hydrogen chloride, is substantially free from chlorine and, as compared with the customary processes, need not be deacidified or dried but can directly be subjected to dehydrochlorination with the resultant formation of 2,3-dichlorobutadiene-1,3.

TABLE 2

| Reaction temp., °C. | Reaction mixture mol % | | | | Observation |
|---|---|---|---|---|---|
| | Unreacted 1,3-dichlorobutene-2 | 1,2,3-trichlorobutene-3 | 1,2,3,3-tetrachlorobutane | 1,2,3,3,4-pentachlorobutane | |
| +20 | 4.3 | 84.3 | 10.3 | 1.1 | |
| +30 | 4.8 | 85.5 | 9.7 | <0.1 | |
| +40 | 3.1 | 83.4 | 11.4 | 1.3 | |
| +55 | 0.8 | 84.5 | 9.6 | 4.3 | |
| +65 to +70 | 4.0 | 73.5 | 18.6 | 3.9 | About 0.5% resinous residue |
| +125 | 7.2 | 39.4 | 49.0 | 3.8 | |
| +30 | 2.4 | 25.5 | 9.8 | 62.3 | reactor charged with FeCl₃ |

The following examples serves to illustrate the invention:

*Example*

A Diabon (registered trademark) reactor 1 (204 cm. and 1.5 cm. wide) surrounded by a cooling jacket 2, filled with ceramic saddles 6 mm. wide and provided at regular distances of 40 cm. with short temperature pipes 3 was charged from above through line 4 within 100 hours with 202 cc./hr. 1,3-dichlorobutene-2 ($d_{20}$:1.146 g./cc.) (total quantity: 23.15 kg.) and 125.5 g./hr. gaseous chlorine (an excess of 10 mol percent) where introduced continuously through a glass nozzle by means of line 5 positoned 20 cm. above the foot of the reactor. The reaction temperature in the center portion of the reactor was adjusted to +20 to +55° C. by means of cooling water. The crude chlorination product flowing off at the bottom of the reactor through a siphon 6 was introduced into the head of an expelling column 7 consisting of a glass or ceramic tube (150 cm. long, 3.5 cm. wide) and filled with ceramic saddles 6 mm. wide. Air was introduced at the bottom of the column through line 8 at a rate such that the reaction product contained but little hydrogen chloride and was free from chlorine. The major amount of hydrogen chloride and chlorine in excess was removed from reactor 1 through line 9. Further amounts of off-gas travelled from siphon 6 through line 10 to main line 9. The residual hydrogen chloride and chlorine in admixture with air were removed from expelling column 7 through line 11 and conveyed to line 9. The distillation of the crude product yielded:

24.95 kg. 1,2,3-trichlorobutene-3 (84.5% of the theoretical)
3.48 kg. 1,2,3,3-tetrachlorobutane
1.83 kg. 1,2,3,3,4-pentachlorobutane and
0.45 kg. resins.

*1,2,3-trichlorobutene-3.*—Boiling point under a pressure of 10 mm. mercury: 39.5 to 41° C.; $n_D^{20}$, 1.4929; $d_{20}$, 1.3440 g./cc.; molecular weight (in benzene): calculated; 159.5; found, 161; chlorine: calc., 66.7%; found, 66.1%.

*1,2,3,3-tetrachlorobutane.*—Boiling point under a pressure of 10 mm. mercury: 55 to 58° C.; $n_{D20}$, 1.4971; $d_{20}$, 1.4275 g./cc.; molecular weight (in benzene): calculated, 195.95; found, 191; chlorine: calc., 71.0%; found, 70.8%.

*1,2,3,3,4-pentachlorobutane.*—Boiling point under a pressure of 10 mm. mercury: 83 to 85° C.; $n_D^{20}$, 1.5163; $d_{20}$, 1.5568 g./cc.; chlorine: calc., 76.95%; found, 75.85%.

We claim:

1. A process for the manufacture of 1,2,3-trichlorobutene-3 from 1,3-dichlorobutene-2 and chlorine comprising continously spraying 1,3-dichlorobutene-2 overhead into a reaction zone operated at 20 to 70° C., introducing gaseous chlorine into the lower part of the reaction zone simultaneously therewith and countercurrently to the descending 1,3-dichlorobutene-2 while using about 1 to 1.1 mols chlorine per mol 1,3-dichlorobutene-2, and the reaction time being 5 to 15 minutes, permitting the excess portion of said gaseous chlorine and the resulting gaseous hydrogen chloride to continuously escape at the head of the cooled reaction zone, continuously withdrawing the resulting liquid, crude chlorination product from the sump of the reaction zone and introducing it into the head of an expelling zone, injecting an inert gas into the lower part of said expelling zone countercurrently to said chlorination product ot entrain the residual chlorine and hydrogen chloride gas, permitting said residual chlorine and hydrogen chloride gas to escape at the head of the expelling zone, removing liquid, crude 1,2,3-trichlorobutene-3 from the sump of the expelling zone and introducing it into a distilling zone.

2. The process of claim 1, wherein the reaction is carried out at temperatures within the range of 20 to 55° C.

3. The process of claim 1, wherein the reaction is carried out under a pressure within the range of about 0.1 to 3 atmospheres absolute.

4. The process of claim 3, wherein the reaction is carried out at atmospheric pressure.

5. The process of claim 1 including charging the reaction zone and the expelling zone with filling material.

6. The process of claim 1 including cooling the reaction zone with water.

7. The process of claim 1 wherein said inert gas is air.

References Cited by the Examiner

UNITED STATES PATENTS

| | | | |
|---|---|---|---|
| 1,964,720 | 7/1934 | Coffman | 260—654 |
| 1,965,369 | 7/1934 | Carothers et al. | 260—654 |
| 2,031,938 | 2/1936 | Deanesly et al. | 260—654 |
| 2,916,527 | 12/1959 | Adams et al. | 260—660 |

LEON ZITVER, *Primary Examiner.*